United States Patent [19]
Olry et al.

[11] Patent Number: 5,991,987
[45] Date of Patent: Nov. 30, 1999

[54] METHODS AND APPARATUS FOR MAKING RING-SHAPED PARTS OUT OF A COMPOSITE MATERIAL, AS WELL AS PREFORMS THEREFOR

[75] Inventors: Pierre Olry, Bordeaux; Dominique Coupe, Le Haillan; Jean-Marie Jouin, Villeurbanne, all of France

[73] Assignee: Societe Nationale D'Etude et de Construction de Moteurs D'Aviation, Paris, France

[21] Appl. No.: 08/973,908

[22] PCT Filed: Jun. 6, 1996

[86] PCT No.: PCT/FR96/00933

§ 371 Date: Dec. 17, 1997

§ 102(e) Date: Dec. 17, 1997

[87] PCT Pub. No.: WO97/00345

PCT Pub. Date: Jan. 3, 1997

[30] Foreign Application Priority Data

Jun. 19, 1995 [FR] France ................................ 95 07280

[51] Int. Cl.[6] .................................................. D04H 13/00
[52] U.S. Cl. ................. 28/142; 28/143; 28/110; 28/114; 28/170
[58] Field of Search .................. 28/107, 109, 110, 28/113, 114, 143, 142, 170, 100, 111, 112; 138/124, 129, 137, 141, 144; 83/13, 14, 23, 54; 188/250 C, 250 B, 250 R, 251 A

[56] References Cited

U.S. PATENT DOCUMENTS

| 4,138,772 | 2/1979 | Dilo ........................................ 28/110 |
| 4,621,662 | 11/1986 | Olry ....................................... 138/129 |
| 4,790,052 | 12/1988 | Olry ....................................... 28/110 |
| 5,226,217 | 7/1993 | Olry et al. ............................... 28/107 |
| 5,546,880 | 8/1996 | Ronyak et al. ........................... 28/107 |
| 5,599,603 | 2/1997 | Evans et al. ............................. 28/110 |

FOREIGN PATENT DOCUMENTS

| 0530741 | 3/1993 | European Pat. Off. . |
| 2506672 | 12/1982 | France . |
| 2584107 | 1/1987 | France . |
| 2683889 | 3/1993 | France . |

*Primary Examiner*—Amy B. Vanatta
*Attorney, Agent, or Firm*—Weingarten, Schurgin, Gagnebin & Hayes LLP

[57] ABSTRACT

Preforms for producing annular parts of composite material are produced by winding a strip (1) of fibrous material around an elliptical mandrel (10) to produce an elliptical sleeve which can be cut obliquely, cutting taking place either before or after one or more densification steps. The cutting plane is inclined relative to the right cross section of the elliptical sleeve, and the inner and outer portions of the cut rings are machined to obtain circular elements. Such elements can produce annular parts of composite material having a reduced tendency to delanination under circumferential stress. The superposed layers are needling together during winding. A uniform needling density per unit area can be obtained by controlled displacement of the needle board (5) and of the elliptical mandrel (10) relative to each other as the mandrel turns, to compensate for the eccentricity of the cross section of the mandrel. These methods are particularly suitable for producing brake disk preforms.

36 Claims, 8 Drawing Sheets

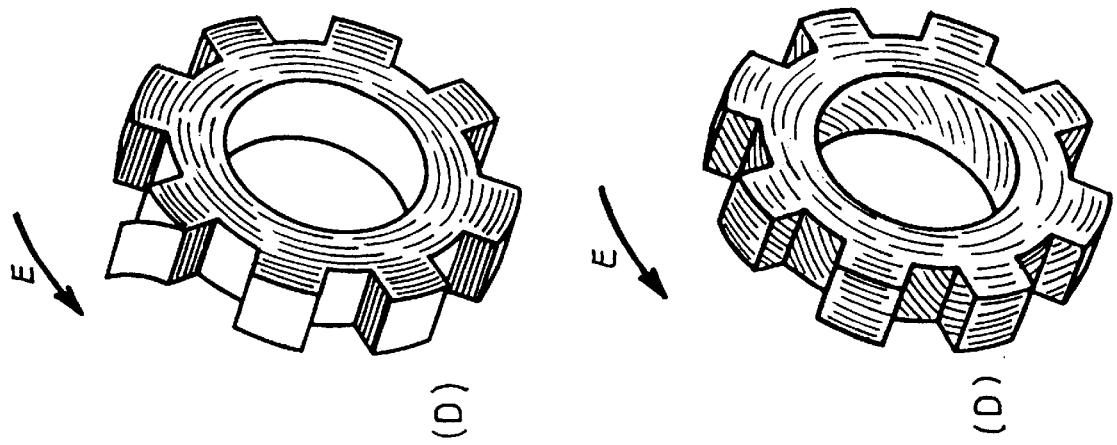
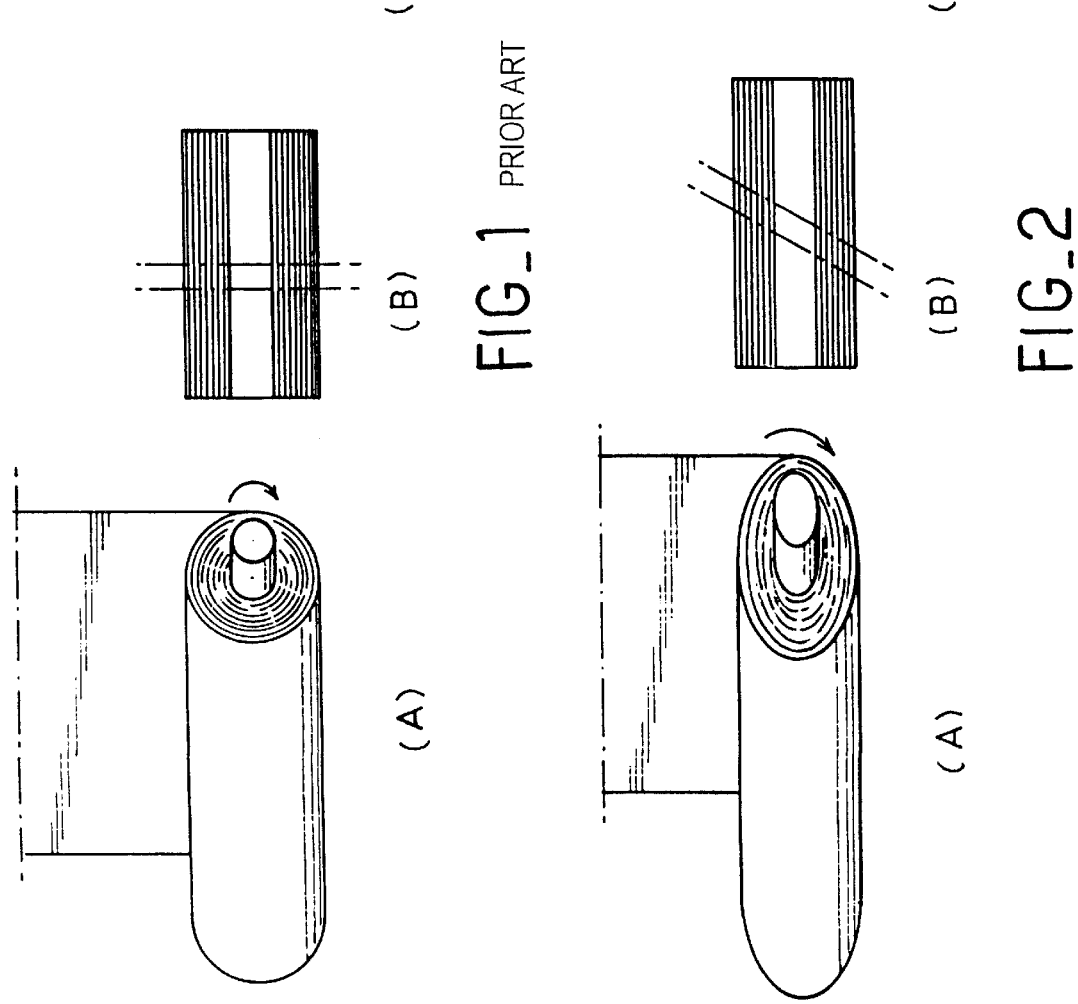
FIG_1 PRIOR ART
FIG_2

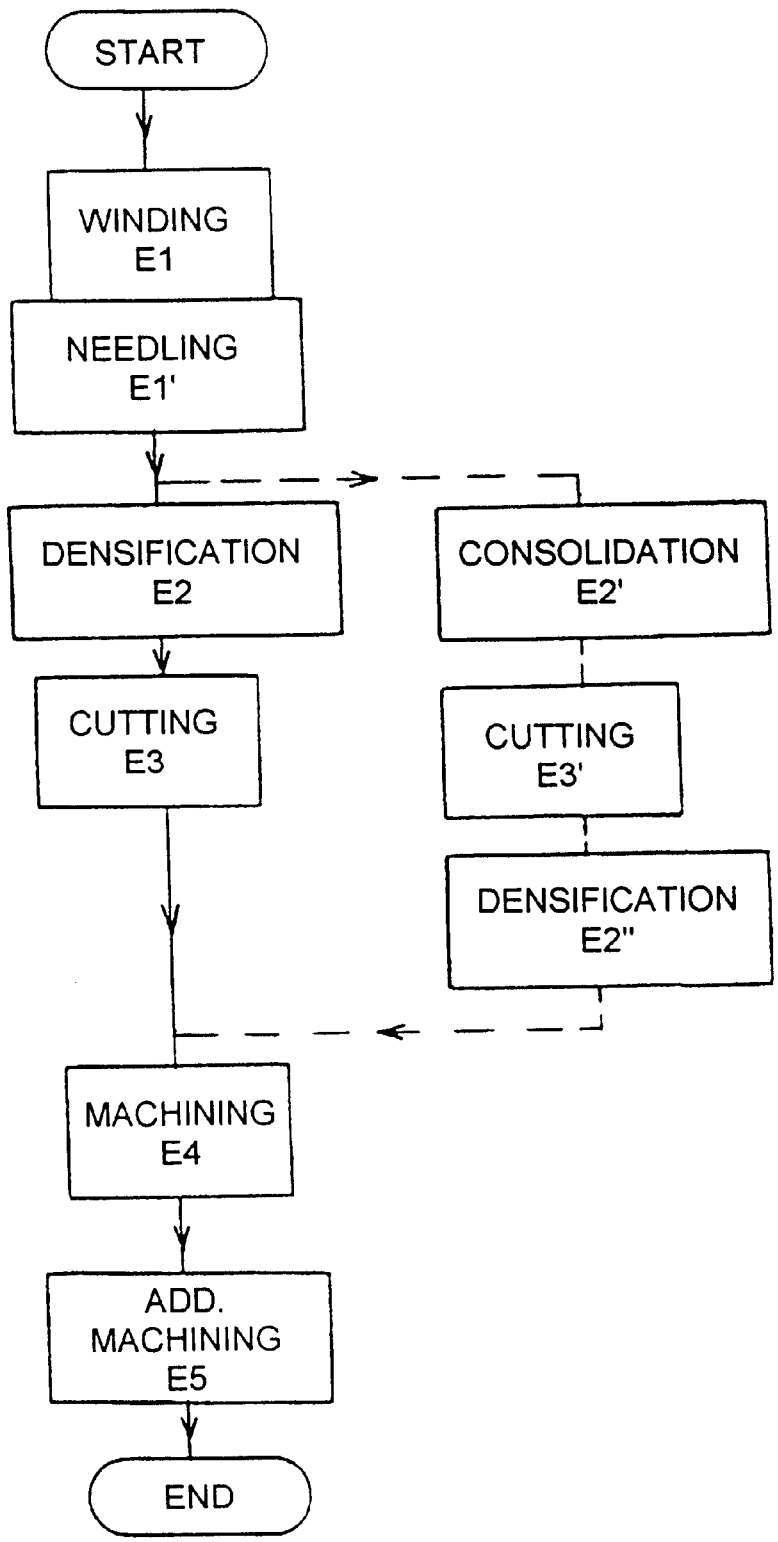
FIG_3

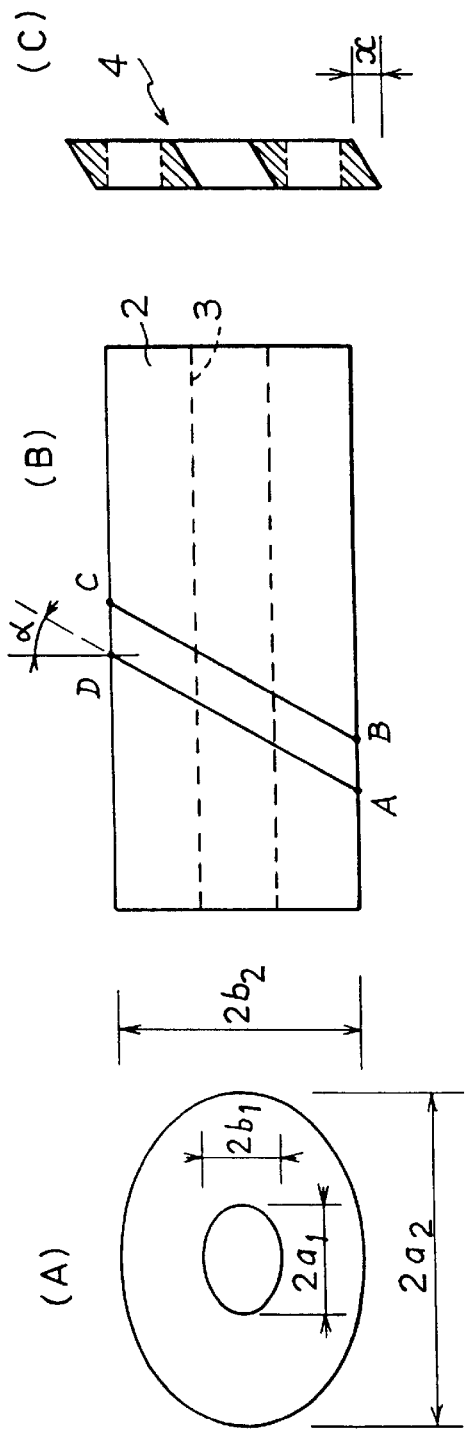
FIG_4
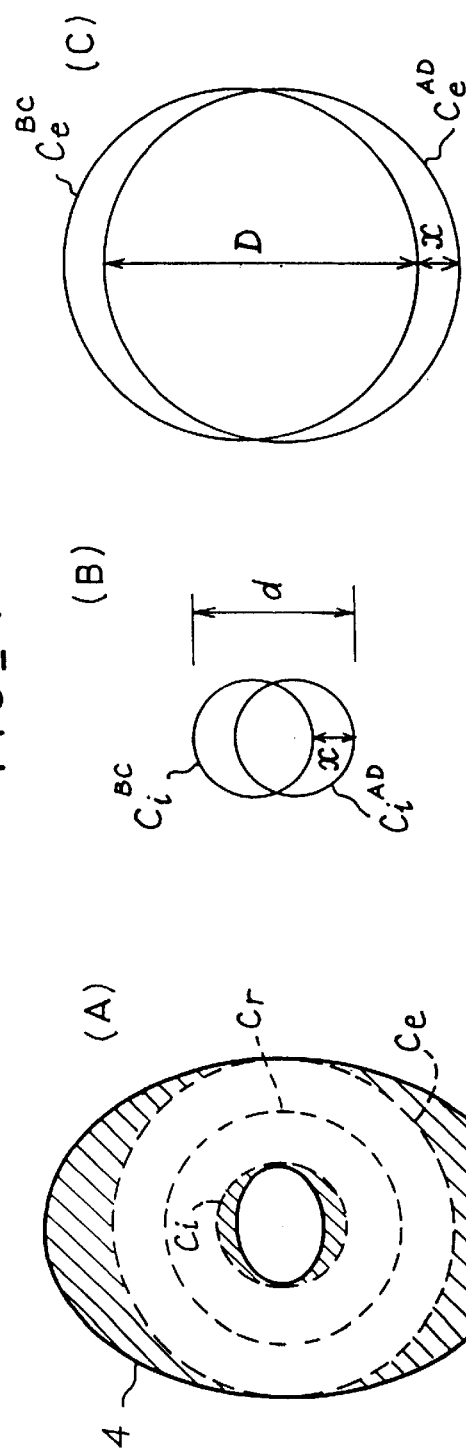
FIG_5

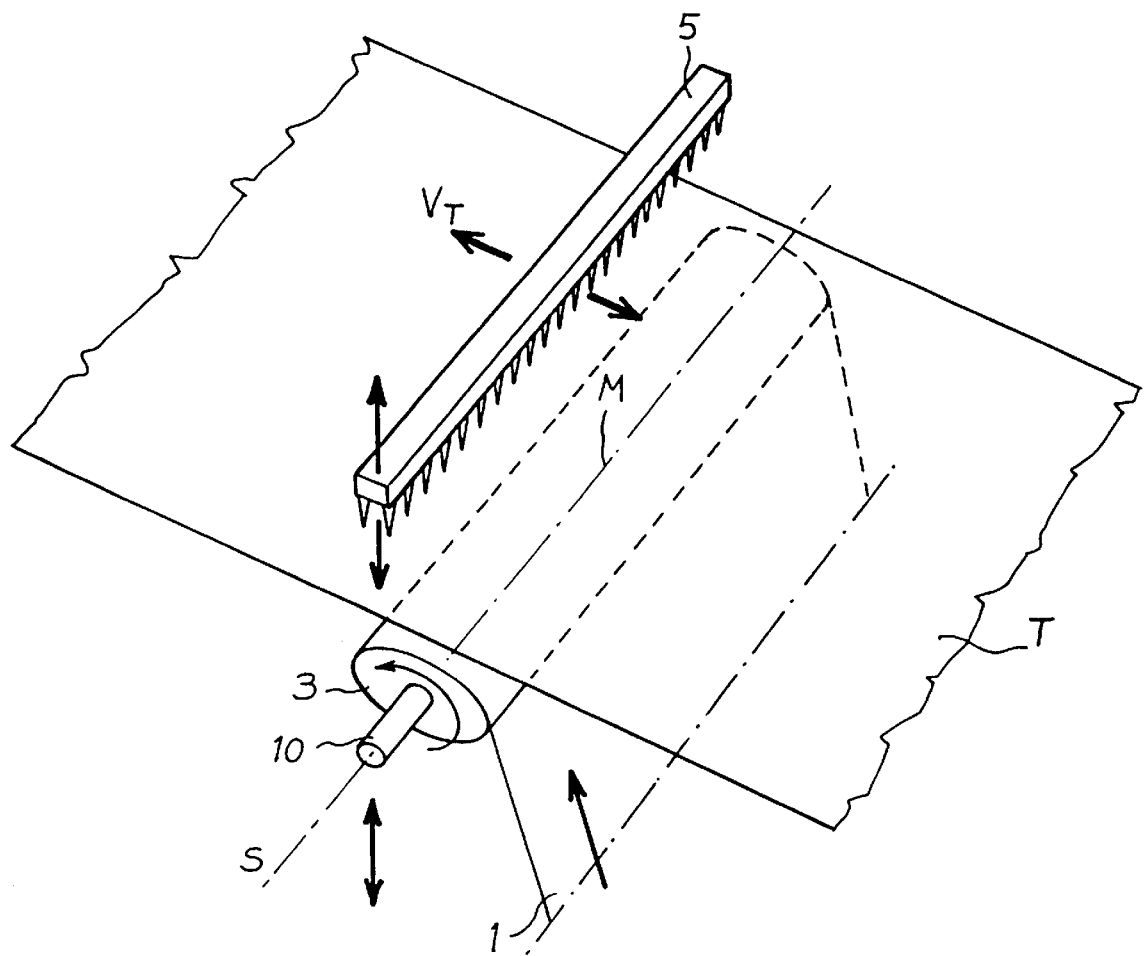
FIG_6

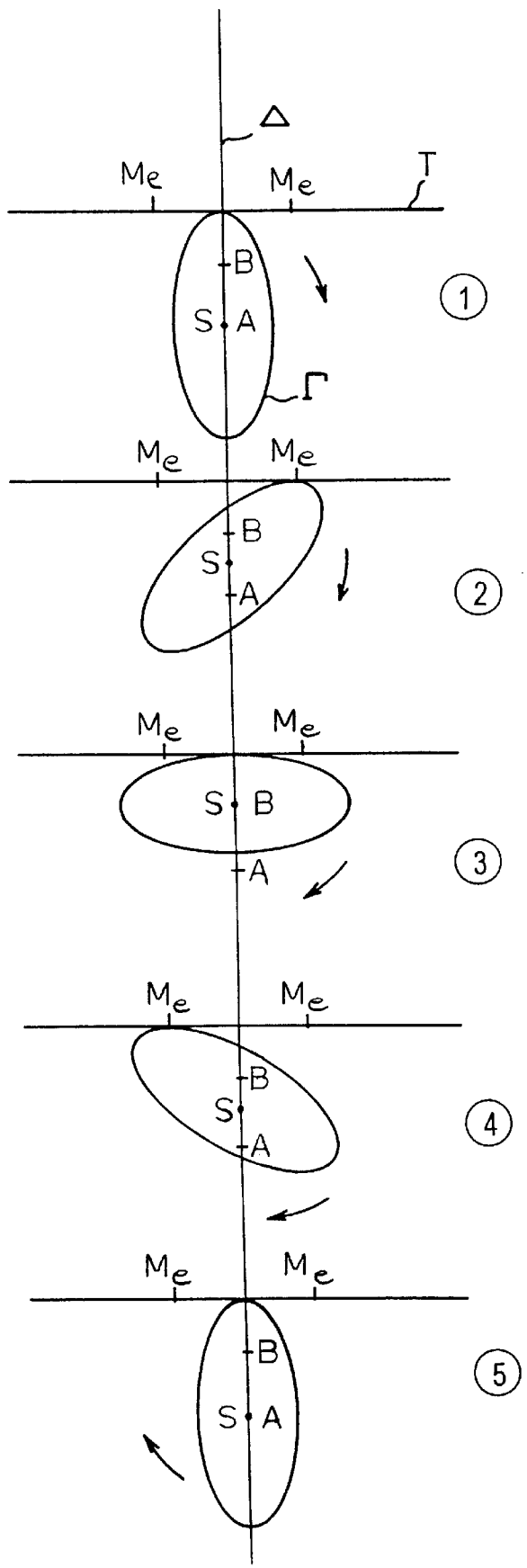
FIG_7

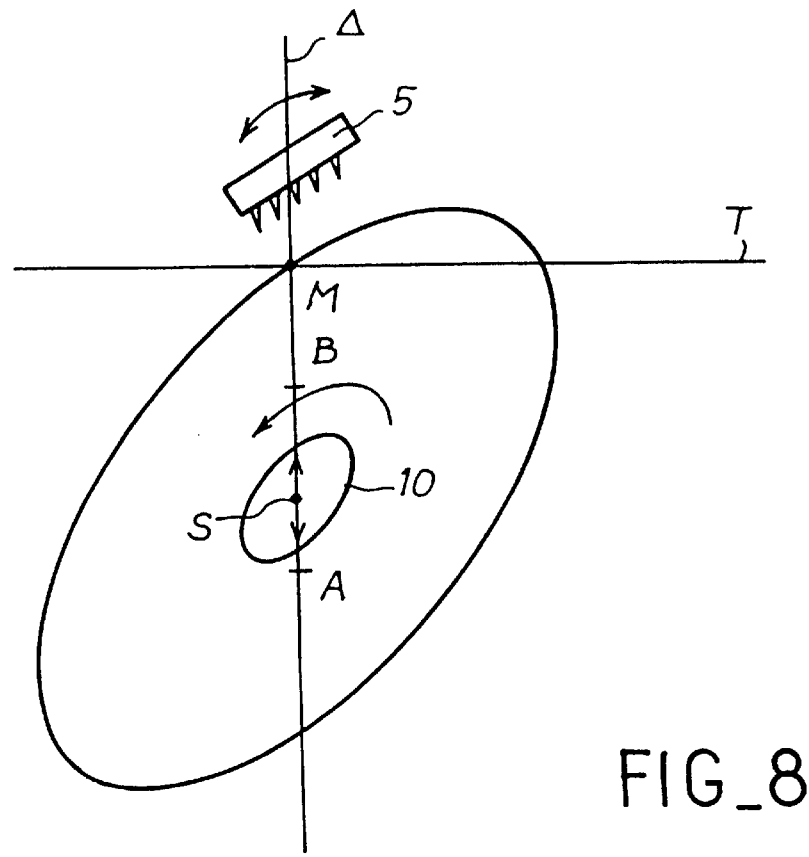
FIG_8
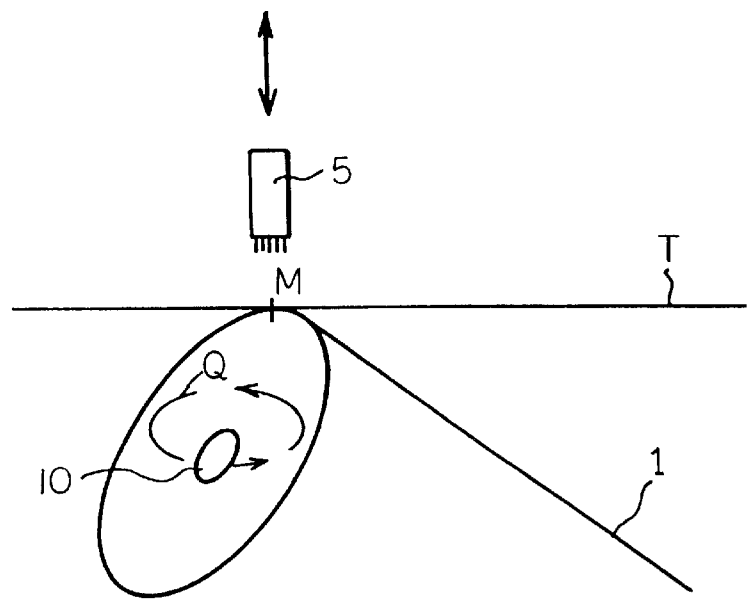
FIG_9

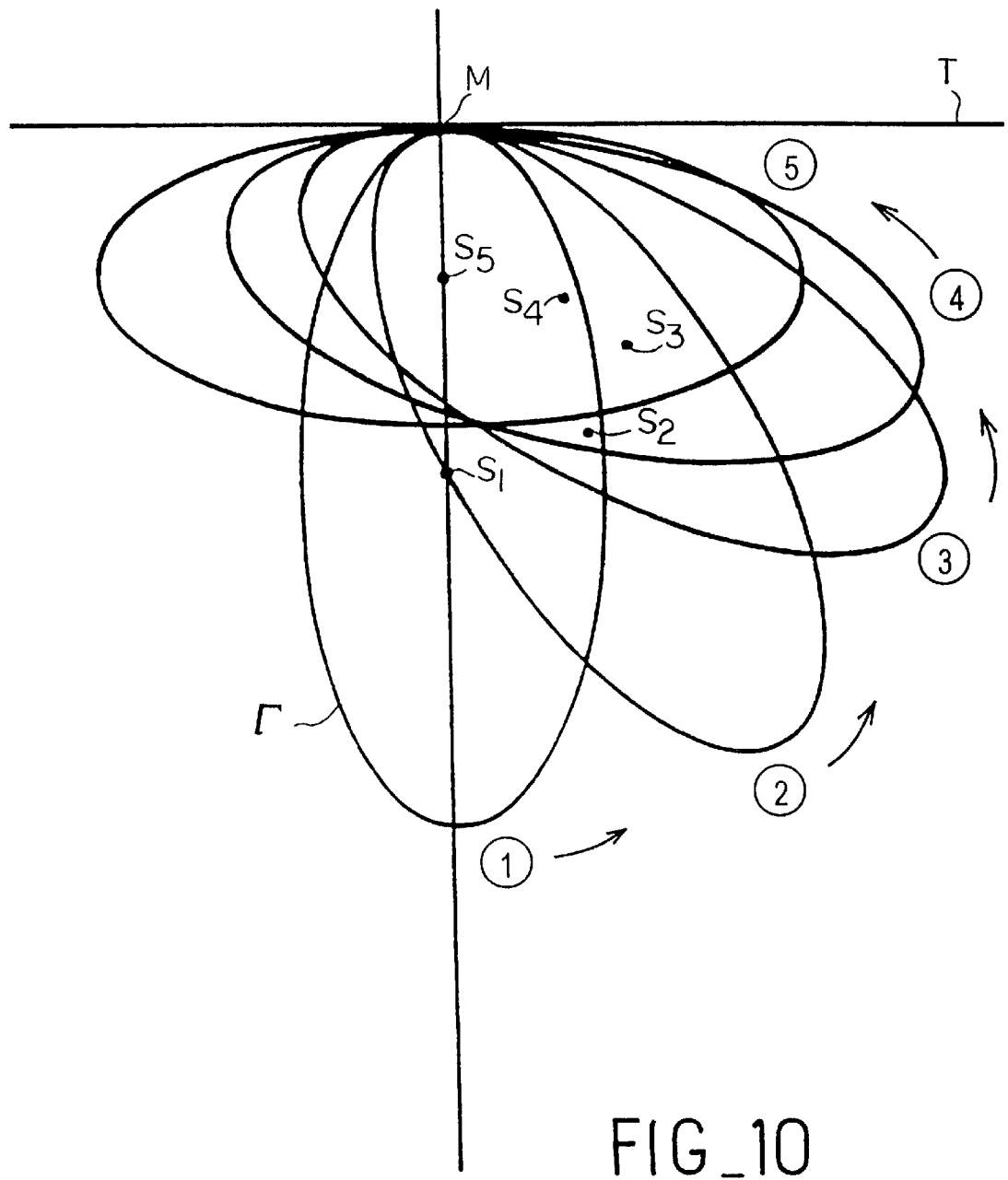
FIG_10

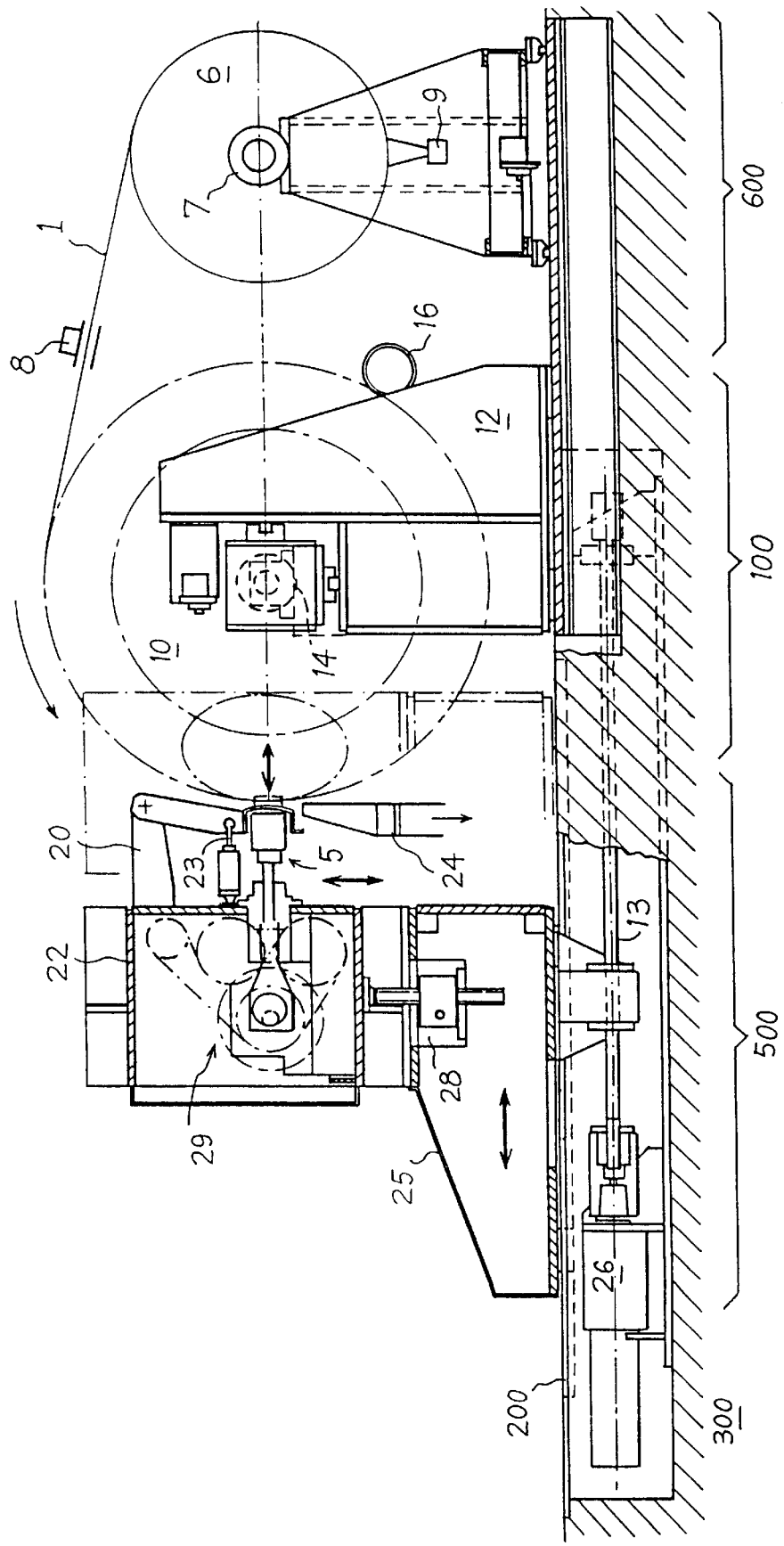
FIG_11

METHODS AND APPARATUS FOR MAKING RING-SHAPED PARTS OUT OF A COMPOSITE MATERIAL, AS WELL AS PREFORMS THEREFOR

BACKGROUND OF THE INVENTIONS

The invention relates to methods and to apparatuses for producing annular parts of composite material and preforms for such parts, and also to the parts and to the preforms themselves. More particularly, the invention relates to methods and apparatus for producing preforms by winding a fibrous strip on a mandrel, the wound layer assembly being intended to be cut into rings either before or after densification by a matrix.

Conventional methods of producing preforms for composite material parts consist in stacking flat layers of fibrous material, cutting or machining the assembly to obtain a preform with the desired shape, and then densifying the preform. When the part to be produced is a brake disk or some other annular part, about half of the weight of the material is lost when producing annular preforms from an assembly of stacked layers.

A number of proposals have been put forward to reduce such waste. One proposal consists in assembling an annular preform to be densified from layers of fibrous material each in the form of juxtaposed sectors, the layers then being stacked. Such a method reduces waste but does not avoid it.

A further proposal made in French patent application FR-A-2 506 672 is described below with reference to FIGS. 1A to 1D. Annular or cylindrical elements are produced by winding a fibrous strip on a cylindrical mandrel (FIG. 1A) to produce a cylindrical sleeve (FIG. 1B). During winding, the superposed layers are connected together by needling. The cylindrical sleeve can be cut perpendicularly to its axis to obtain annular preforms to be densified (FIG. 1C).

A method similar to the above has also been described in French patent application FR-A-2 584 107.

That method avoids wasting material, but the parts made from preforms produced by that method have disadvantageous features which come to light during service. Brake disks are subjected to shear stresses in a tangential direction during use. The stresses are particularly high in the notches formed in the inner or outer border (FIG. 1D) to connect the disk with a moving or a fixed portion. Such shear stresses E can cause the part to delaminate, i.e., it is destroyed by the layers in the preform separating.

SUMMARY OF THE INVENTION

In one aspect, the invention provides a method and apparatus for producing preforms for annular parts of composite material which have a high resistance to delamination, and which limit the loss of material caused by carrying out the method.

In the method and apparatus of the invention, a strip of fibrous material is wound around an elliptical mandrel to form an elliptical sleeve. The elliptical sleeve can be cut obliquely to produce annular preforms for densification or it can itself act as the preform for densification, cutting being delayed until the end of one or more of the densification steps. The cutting plane is inclined to the right cross section of the elliptical sleeve, i.e. the cutting plane is not perpendicular to the sleeve axis. The inner and outer portions of the cut rings are machined to obtain circular elements.

The method and apparatus described above exploit the fact that the projection of an ellipse onto a plane passing through its major axis and at an angle $\alpha$ to the plane of the ellipse is a circle of diameter equal to the major axis of the ellipse. The angle a can be calculated using the following formula:

$$\cos \alpha = b/a$$

where:
  $2a$=the major axis of the ellipse and $2b$ =the minor axis of the ellipse.

The principle of this aspect of the invention is illustrated in FIGS. 2A to 2D.

FIG. 2A shows a strip of fibrous material being wound around an elliptical mandrel and FIG. 2B shows the cutting plane of the elliptical sleeve produced by the sleeve produced by the assembly of superposed layers. In this example, the ring cut from the sleeve is perfectly circular at its half-width, but elliptical at the inner and outer peripheries. The cutting plane can also be selected so that the ring is circular at its inner or outer periphery or at another distance from the peripheries of the ring. (In theory, a cutting plane could be selected which would render the cut ring elliptical throughout its width but this would increase the amount of material which would have to be removed to obtain a circular element).

Following cutting, the inner and outer peripheries of the ring are machined to produce an element which is circular overall (see FIG. 2C). During use of a part produced from such an element, a shear stress E in a tangential direction is no longer in a direction which encourages delamination of the layers making up the preform of the part (see FIG. 2D).

In this aspect of the invention, preforms for producing annular parts can be produced by a method which results in minor losses of material and these preforms can result in annular parts having a reduced tendency to delaminate during use.

The closer the cutting angle relative to the right cross section of the sleeve is to 45°, the more resistant are the parts cut from this sleeve to delamination under shear in a direction tangential thereto. However, material wastage increases with increase in this angle (hereinafter termed the "cutting angle"). Thus the cutting angle must be optimized to obtain parts which perform well mechanically and which also have acceptable material losses. The cutting angle is preferably in the range 10° to 45°. When a cutting angle of 45° is used, material wastage is fairly high, about 35%. It is thus more advantageous to use a cutting angle in the range 10° to 30°.

This first aspect of the invention also encompasses a method of producing annular parts of composite material, comprising the above-described method of producing a preform plus steps of densifying, cutting, and machining the preform. Additional machining of the part may be necessary in order to adapt the part to a specific use, for example as a brake disk.

Brake disk preforms are advantageously produced by needling two-dimensional fabric formed from yams or tows of pre-oxidized polyacrylonitrile (PAN), carbon roving (application FR-A-2 669940) or hybrid yams (French patent application, number 95 06 200). In the prior art, two-dimensional fabrics, for example cloth or sheets of tows or yams, are needled to each other to form a slab from which annular brake disk preforms are cut.

When materials are to be exposed to high thenmomechanical stresses, as is generally the case for brake disks, it is important that the properties are kept constant throughout the mass in order to avoid non-uniformity in mechanical and tribological properties. It is thus important that the needling density is kept uniform in a sleeve which is to act as a preform or a source of preforms for brake disks. However, if a sleeve is produced by winding around an elliptical mandrel, needling can prove to be difficult.

In the known method described in FR-A-2 584 107 where a fibrous strip is wound around a cylindrical mandrel, each wound layer is needled by a needle board as soon as it is deposited onto the mandrel. The mandrel is driven in rotation about its axis, the position of that axis being fixed, and the needle board which extends parallel to a generatrix of the mandrel is reciprocated in a direction perpendicular to the mandrel axis. The amplitude of the displacement of the needle board is constant. In order to ensure a uniform needling depth in the wound layers throughout the method, the average distance between the needle board and the mandrel axis is increased as the cumulative thickness of the layers increases.

Such a method cannot be used directly with an elliptical mandrel.

In a further aspect, the invention provides methods and apparatuses for producing preforms for producing annular parts, in which a strip of fibrous material is wound around an elliptical mandrel, and the superposed layers are needled in a uniform manner.

To this end, a method and apparatus are provided in which, according to the invention, a strip of fibrous material is wound around an elliptical mandrel and the wound layers are needled using a needle board while the displacement between the mandrel and the average position of the needle board is controlled so as to compensate for the eccentricity of the mandrel cross section. The displacement between the needle board and the mandrel is preferably such that the needle board comes into contact with the layers to be needled in a plane (the needling plane) which is fixed relative to the average position of the needle board.

Control of the needle board is simplified if the needling frequency remains constant, resulting in a need to keep the relative velocity between the needle board and the surface to be needled constant in order to obtain a constant needling density per unit area. It is also essential that at the moment of contact, the needling surface of the needle board is in a plane which is tangential to the facing needling surface in order to obtain a constant needling density per unit area. Displacement of the elements in order to satisfy these conditions is facilitated if the rate of displacement of the needle board is kept constant and the rotation speed of the mandrel and/or the rate of displacement of its axis is varied.

In the following description, displacements of the needle board and/or the axis of the mandrel are described. It should be understood that each displacement of the needle board can be replaced by an appropriate displacement of the mandrel or by a combination of displacement of the needle board and of the mandrel, and vice versa. The important point is to produce a relative motion between the needle board and the surface to be needled which results in uniform needling of the wound layers.

However, as is well known in producing needled preforms, the needles in the board must not strike at exactly the same place at each turn of the mandrel since such a method would produce weakened zones in the sleeve which was produced. The slight offset required to avoid this can be achieved by displacing the needle board (or the mandrel) in a longitudinal direction relative to the mandrel (i.e., in a direction parallel to the axis of rotation of the mandrel).

In a first aspect of the invention, in a first implementation, an elliptical mandrel is driven in rotation about its axis so as to wind a strip of fibrous material around its periphery and, at the same time, the axis of the mandrel periodically moves towards and away from a needling plane along a path which is perpendicular to the needling plane. The curved surface of the outer layer wound on the mandrel is flush with the needling plane, the region of contact being a line. The displacement of the axis of the mandrel is regulated so as to keep the curved surface in a position such that the needling plane is tangential thereto at the contact line. This means that the portion of the curved surface which is flush with the needling plane slides in this plane with reciprocating motion. The needle board facing the curved surface of the mandrel moves towards and away from the needling plane so as to strike and pierce the outer layers wound around the mandrel. The needle board is also displaced with reciprocating motion in the needling plane in order to follow the motion of the contact line of the surface of the wound layers with the needling plane. At the moment of contact, the needling surface of the needle board is oriented in a direction which is tangential to the facing needling surface.

This first implementation can also be carried out by keeping the axis of rotation of the mandrel fixed. The relative motion required between the needle board and the mandrel is produced by displacement of the needle board alone.

In a second implementation, the elliptical mandrel is still driven in rotation about its axis and, at the same time, the axis of the mandrel periodically moves towards and away from a needling plane along a path which is perpendicular to the needling plane. In this second implementation, the region where the curved surface of the outer wound layer is flush with the needling plane is not displaced in this plane; but the orientation of the curved surface relative to the needling plane changes periodically as the mandrel turns. Thus the needle board does not need to be displaced in the needling plane. It is sufficient that the orientation of the needling surface of the needle board oscillates periodically so that it is in a plane which is tangential to the outer surface of the wound layers at the moment of contact between the needle board and the layers to be needled.

In a third implementation, the elliptical mandrel is driven in rotation about its axis and, at the same time, the axis of the mandrel is displaced to follow a path formed by two half-ellipses. This displacement is such that at any time, a portion of the curved surface of the outer wound layer is in a fixed location in the needling plane, which plane is tangential to that part of the curved surface. The needle board strikes at this fixed location in the needling plane and the orientation of the needling surface can remain fixed.

The first of these three implementations is preferred because of its relative operational simplicity.

In a further aspect of the invention, preforms for producing annular parts can be produced by winding a strip of fibrous material on an elliptical mandrel, with simultaneous and uniform needling of the wound layers, to produce an elliptical mandrel which can be cut on a slant.

This second aspect of the invention also provides a method of producing annular parts of composite material comprising the above-described method of producing a preform plus steps of densifying, cutting, and machining the preform.

The densification step in the method of manufacturing annular parts in accordance with the first and second aspects of the invention can be carried out using any of the known methods. Densification can be begun before or after removing the sleeve from the mandrel. The sleeve can also be cut into annular parts before densification or after one or more of the densification steps. Preferably, at least the first densification step is carried out before the sleeve is cut because the material which has been consolidated in this way is stronger after the first densification step.

One known densification method is the conventional isothermal isobaric chemical vapor infiltration method. The element to be densified is placed in a vessel into which a gas is introduced, which gas, under predetermined temperature and pressure conditions, produces the material constituting the matrix by means of its constituents decomposing or reacting together. In the conventional method, the vessel includes a susceptor, generally of graphite, which delimits an infiltration chamber and which is coupled with an inductor which surrounds the vessel. When this method is applied to producing annular parts from a sleeve, the sleeve is generally cut before densification, so that the gas can infiltrate the internal pores of the parts more easily and uniformly. However, this gives rise to repeated interruptions of densification to enable the faces of the parts can be skinned to re-open the pores completely and allow the gas to penetrate once again.

With elliptical sleeves, at least partial densification of the sleeve can be carried out by a temperature gradient type chemical vapor infiltration method before the sleeve is cut. In this method, the sleeve can be heated by inductive coupling between the inductor and a central core on which the sleeve is positioned. Thus a temperature gradient is established between the inner surface of the sleeve in contact with the rotor, which is the hottest surface, and the outer surface. Densification is then encouraged in those parts of the sleeve which are furthest from the outer surfaces, and the risk of premature blocking of the superficial pores by unwanted deposits is reduced, eliminating the need for skinning. It should be noted that the sleeve can also be heated by direct inductive coupling between the inductor and the sleeve when it is of a suitable nature (for example, when the sleeve is of carbon). A temperature gradient chemical vapor infiltration densification method is described in French patent application FR-A-2 711 647, for example.

In order to further reduce the loss of material in producing annular parts in accordance with the first and second aspects of the invention, an elliptical cross section sleeve can be produced, both ends of which are planar faces which are inclined relative to a right cross section of the sleeve, i.e., the faces are parallel to the envisaged cutting plane for the sleeve.

Further features and advantages of the present invention will become apparent from the following description which is made by way of indication and is not limiting, and made with reference to the accompanying drawings in which:

BRIEF DESCRIPTION OF SEVERAL VIEWS OF THE DRAWINGS

FIG. 1 (FIGS. 1A to 1D) illustrates a known method of producing annular preforms for annular parts of composite material, the method using a cylindrical mandrel;

FIG. 2 (FIGS. 2A to 2D) illustrates a method of the present invention for producing annular parts of composite material, the method using an elliptical mandrel;

FIG. 3 is a flow chart showing typical steps in producing an annular part using the methods of the invention;

FIG. 4 (FIGS. 4A to 4C) illustrates cutting an elliptical sleeve in accordance with the invention to obtain an annular element;

FIG. 5 (FIGS. 5A to 5C) illustrates an example of cutting an elliptical sleeve of the invention to obtain an annular element with pre-determined dimensions;

FIG. 6 indicates the dispositions of an elliptical mandrel and the needle board in a first method of winding a strip on an elliptical mandrel of the invention;

FIG. 7 is a diagram illustrating the disposition of the elliptical mandrel in the first winding method;

FIG. 8 is a diagram illustrating a second method of winding a strip on an elliptical mandrel;

FIG. 9 indicates the positions of an elliptical mandrel and the needle board in a third method of winding a strip on an elliptical mandrel of the invention;

FIG. 10 is a diagram illustrating the displacement of the elliptical mandrel in the third winding method; and FIG. 11 is a side view of an embodiment of apparatus for carrying out the first implementation of the winding and needling method of the invention.

DETAILED DESCRIPTION OF THE INVENTION

Producing a preform for producing a composite material annular part using the methods of the present invention and producing the part itself comprise several steps, as shown in FIG. 3.

A first step E1 consists in winding a strip of fibrous material around an elliptical mandrel. The fibrous material strip may consist in any known material for producing composite material parts, or a mixture of such materials. The fibers are in a suitable form (sheets, strips, woven cloth, etc., of tows, continuous yarns, roving, etc.). The material constituting the fibers depends on the envisaged application. For brake disks, carbon fibers are preferably used, but other materials may be suitable, in particular ceramics.

The wound layers are needled as they are deposited on the mandrel (step E1'). As will be described below, several methods are possible for ensuring that the needling density is uniform. When the assembly of layers wound on the mandrel has reached a desired thickness, winding is stopped.

The elliptical sleeve thus produced is preferably then densified to fill the internal pores thereof (step E2), for example by chemical vapor infiltration, and cut on a slant to obtain rings (step E3). The elliptical sleeve thus constitutes the preform to be densified.

The sleeve can also be cut before starting densification; in this case the cut fibrous rings constitute the preforms to be densified. This is possible only when the elliptical sleeve is sufficiently strong for it to be possible to withdraw the mandrel. Usually, needling the wound layers is sufficient to produce a sleeve with the required strength. The sleeve can also be produced from layers of resin-impregnated fibrous material, the sleeve being treated before withdrawing the mandrel to form a single piece from the wound layers by polymerizing the resin.

If the elliptical sleeve is not strong enough to be removed from the mandrel after winding, then densification can be started and continued until the sleeve has consolidated sufficiently (step E2'). At this time, the mandrel can be withdrawn and the sleeve can be cut into rings (step E3'). The pre-densified elements thus produced could, after machining, be returned to the densification unit to finish densification (step E2").

If the conventional isothermal chemical vapor infiltration method already described is used, the densified parts would be more uniform if the mandrel were to be withdrawn and the preforms cut before densification or at the latest during the densification process. In contrast, the sleeve can be left uncut until densification is complete if the above-described temperature gradient method is used; preform densification is uniform and material loss is reduced because no skinning is required.

The rings cut from the elliptical sleeve are not perfectly circular. The rings have to be machined in order to give them a perfectly annular shape (step E4).

One or more additional steps are necessary for producing an annular part, such as a brake disk, from the annular element described above. The part must, for example, undergo final machining in order to make it suitable for its end use (step ES). When the parts are for use as brake disks, this final machining forms notches in the inner or outer periphery of the parts.

One of more of the steps described above can be carried out using one or more robots. The use of robotic means is particularly envisageable when producing the elliptical sleeve in the case of simultaneous winding and needling. It is further noted that the mandrel can be provided with a protective coating such as felt, into which the needles can penetrate without being damaged when needling the first layers, as described in FR-A-2 584 107 cited above.

Before describing apparatus for carrying out the methods of the invention, more details are now given concerning the steps of cutting the elliptical sleeve and the simultaneous winding and needling steps.

Cutting the sleeve is explained below with reference to FIGS. 4 and 5.

FIGS. 4A and 4B illustrate an elliptical sleeve 2 having a central hole 3 (corresponding to the elliptical mandrel used for winding). FIG. 4A is an end view and FIG. 4B is a side view. In this example, the cutting plane makes an angle of 30° relative to a right cross section of the sleeve. Lines AD and BC show two cutting planes delimiting a ring 4.

Cutting elliptical sleeve 2 makes use of the fact that the projection of an ellipse in a plane passing through the major axis thereof and making an angle $\alpha$ relative to the plane of the ellipse is a circle of diameter equal to the major axis of the ellipse. The relationship between the angle a and the dimensions of the ellipse is given by the formula:

$$\cos \alpha = b/a$$

where $2a$ = the major axis of the ellipse; and
$2b$ = the minor axis of the ellipse.

When the layers of material are wound onto an elliptical mandrel, the ratio b/a of the ellipse defined by the outer layer differs from that of the ellipse defined by the mandrel (see FIG. 4A). Thus in a cutting plane which is inclined relative to the plane normal to the axis of the mandrel, a circular shape is obtained at the inner periphery of the sleeve but an elliptical shape is obtained at the outer periphery of the sleeve. The eccentricity of a ring cut from the elliptical sleeve is thus not constant throughout the width of the ring. The cutting angle $\alpha$ is preferably selected to produce a circular shape either at the inner periphery of the cut ring (at the mandrel) or at the outer periphery of the cut ring (at the outside of the sleeve), or at a distance intermediate between the inner and outer peripheries, and the outer and/or inner periphery of the ring is/are machined to obtain a circular shape.

Further, although the faces of each ring corresponding to the cutting planes are parallel, they are offset by a distance m. This means that the curved surfaces of the peripheries of the ring (inner and outer) are not perpendicular to the faces corresponding to the cutting planes (see FIG. 4C). This is an additional reason for machining the cut ring in order to produce an exact annular shape.

FIG. 4C shows a ring 4 cut using a cutting plane which leads to a circular shape in this plane half way between the inner and outer peripheries of the ring, i.e., at the half-width of the ring. The dotted lines in the figure correspond to the portions of the ring which must be removed to produce an element with a truly annular shape.

As explained above, with an annular preform intended to produce annular parts which can be subjected to shear stresses in a tangential direction, the cutting angle is selected to optimize the balance between material wastage and the desired resistance to delamination in the annular parts. In this respect, a cutting angle in the range 10° to 45° is preferred, and an angle in the range 10° to 30° has been shown to be highly advantageous as regards reducing material loss. Once the cutting angle has been selected, the eccentricity of the mandrel can be selected so as to obtain a circular shape in the cutting plane at the desired width.

When selecting the dimensions of the elliptical mandrel, and the thickness of the sleeve obtained by winding for producing preforms with defined inner and outer dimensions, the effect of machining on the inner and outer dimensions of the cut rings must be taken into account. FIG. 5 shows an example of cutting.

FIG. 5A shows the shape of cut ring 4 in any one of cutting planes AD or BC of FIG. 4 (the shape is the same along the thickness of the ring). A portion at the half-width of the cut ring has a circular shape (see circle $c_r$ in FIG. 5). The outer and inner peripheries of the ring are elliptical so the ring peripheries must be machined to obtain a circular shape (around outer circle $c_e$ and inner circle $c_i$ in the figure).

FIGS. 5B and 5C show diagrams indicating the offset between the inner circles ($c_i^{AD}$, $c_i^{BC}$) and outer circles ($c_e^{AD}$, $c_e^{BC}$) defined in planes AD and BC of FIG. 4B; this offset exists between the front and rear faces of ring 4. The relationships between the dimensions of the elliptical sleeve and the cutting angle and the dimensions of the annular element obtained after machining ring 12 (removal of the shaded portions in FIG. 5A) can be seen immediately in FIG. 5. If $2a_1$ and $2b_1$ are the lengths of the major and minor axis of the ellipse defined by the inner periphery, and $2a_2$ and $2b_2$ are the lengths of the major and minor axis defined by the outer periphery of the sleeve in the plane normal to the axis thereof, $\alpha$ is the cutting angle relative to the plane normal to the sleeve axis, d and D are the inner and outer diameters of the annular preform to be produced and e is the thickness thereof, we have:

$$d \geq 2a_1 + x$$
$$\geq 2a_1 + e \cdot \tan \alpha$$

and $$D \leq 2a_2 - x$$
$$\leq 2a_2 - e \cdot \tan \alpha$$

If the desired dimensions of the annular preforms are d=250 mm, D=450 mm and e=25 mm, and if the cutting angle is 30°, then the elliptical mandrel must have a major axis $2a_1$ no greater than 225 mm and the ellipse defined by the outer surface of the sleeve must have a major axis $2a_2$ not less than 475 mm. Further, because the relationship $\cos \alpha = b/a$ applies to the half-width of the sleeve, using the values $2a_1 = 225$ mm and $2a_2 = 475$ mm:

$$\cos 45° = \frac{1}{2}(b_1 + b_2)/\frac{1}{2}(a_1 + a_2)$$

$$0.707 = \frac{1}{2}(b_1 + b_2)/175$$

$$b_1 + b_2 \approx 247.5$$

Since $2b_2-2b_1=2a_2-2a_1=2\times$thickness of wound layers ($2\times f$) the minor axis $2b_1$ of the mandrel equals 122.5 mm and the minor axis $2b_2$ of the ellipse defined by the outer surface of the sleeve equals 372.5 mm.

One consequence of the cutting method described above is that the ends of the elliptical sleeve are not used. In the example of FIG. 5, about thirty parts can be obtained from a sleeve that is 1.5 meters (m) long resulting in a waste of about 350 mm at the sleeve ends. Clearly, this wastage represents a smaller percentage if the sleeve is longer.

The present invention can also be carried out so as to further reduce material losses, by using a sleeve with an elliptical cross section having planar faces at both ends which are inclined relative to a right cross section of the sleeve, i.e. the faces are parallel to the cutting plane envisaged for the sleeve. Thus parts can be cut from the entire length of the sleeve and no unused material is left at the ends. A sleeve with such a shape can be produced by displacing the mandrel along its axis with reciprocating motion during winding. Such a sleeve can also be obtained by displacing the roller supplying the fibrous material for winding with reciprocating motion during winding, in a direction which is longitudinal relative to the mandrel. When a fairly small sleeve cutting angle is used this method does not produce too great a perturbation as regards deformation of the sheet or the angle of the fibers relative to the friction surfaces of the parts cut from the sleeve.

The winding step is now described. When needling is carried out simultaneously, this step must be applied to ensure that the needling density is uniform. It means that the needle board and the mandrel are periodically displaced relative to each other in order to compensate for the eccentricity in the cross section of the mandrel.

FIG. 6 shows a first implementation of a winding method with simultaneous needling of the wound layers. In this implementation, an elliptical mandrel 10 is driven in rotation about its axis S to wind a fibrous material strip 1 around its periphery. At the same time, the axis of mandrel S periodically moves towards and away from a needling plane T along a rectilinear path $\Delta$ perpendicular to plane T. The curved surface of the outer layer wound on the mandrel is flush with needling plane T, the contact region being a line M. A needle board 5 facing the outer surface of the wound layers is driven in reciprocating motion perpendicular to the needling plane T in order to strike and needle the outer layers wound on the mandrel.

The displacement of the mandrel as it describes a half-turn about its axis in this implementation is shown in FIG. 7. The ellipse $\Gamma$ in the figure represents the outer layers wound on mandrel 10. The limits of the displacement of axis S of the mandrel along line $\Delta$ are positions A and B, axis S being at limit A when the major axis of ellipse $\Gamma$ is perpendicular to needling plane T (positions 1 and 5 in FIG. 7) and axis S being at limit B when the minor axis of ellipse $\Gamma$ is perpendicular to needling plane T (position 3 in FIG. 7). As the axis of the mandrel moves, the contact line M between the curved surface of the outer layer wound on the mandrel and needling plane T moves in this plane with reciprocating motion between two limits $M_e$ (positions 2 and 4 in FIG. 7).

Needle board 5 is also displaced with reciprocating motion in order to follow the motion of contact line M in needling plane T.

In order to maintain needling at a constant density per unit area, and if the striking frequency of the needle board is constant, the relative tangential velocity between the needle board and the outer layer wound on the mandrel must be constant. The translational velocity ($V_T$) of contact line M in needling plane T can be kept constant by synchronizing the rate of displacement of the mandrel axis between positions A and B and the rate of rotation of the mandrel about its axis of rotation.

For an ellipse $\Gamma$ with a major axis $2a_2$ and a minor axis $2b_2$, the distance between extremes $M_e$ is $2(a_2-b_2)$. If the ellipse is the right cross section of a cylinder with axis CC'(C being the center of ellipse $\Gamma$), it is preferable to move axis CC' using the translational motion described above. In this case, if the mandrel is rotated at a rate $\omega(t)$, so that the velocity $v_T$ is constant, a multiaxial sheet or fabric can be wound on the mandrel at a constant tangential velocity.

The invention provides a variation of this first implementation of a method of winding with simultaneous needling of wound layers in which the rotational axis of the mandrel remains fixed. The relative motion required between the needle board and the mandrel is produced by displacing the needle board alone. In this case, needling no longer takes place in a single plane but in a series of mutually parallel planes. In order to obtain a constant relative velocity at the moment of contact, the rate of needle board displacement is preferably kept constant and the rate of rotation of the mandrel is varied.

Further, at each rotation of the mandrel, it must move away from the average position of the needle board so that the needling depth is kept constant as the thickness of the preform increases during needling, since the needling stroke remains constant and equal to the thickness of a few layers, for example. It is clear that this motion can be effected by displacing the mandrel and/or the needle board. After winding the last layer, a plurality of finishing needling passes can be carried out in order to keep the needling density constant in the layers located close to the outer periphery, as described in FR-A-2 584 107 cited above.

FIG. 8 shows a second implementation where an elliptical mandrel 10 is still rotated about its axis S while the axis of the mandrel periodically moves towards and away from needling plane T between two extremes A, B along a rectilinear path $\Delta$. This time, the motion of the mandrel axis is such that the curved surface of the outer layers wound on the mandrel is tangential to needling plane T or the section along a fixed line M. Needle board 5 comes into contact with the layers to be needled in a region comprising this line M. Thus needle board 5 does not need to be displaced in the needling plane. However, the needle board has an orientatable head which periodically oscillates in order to adapt its orientation to the direction normal to the curved surface of the layers to be needled at line M. The orientation j of the needling surface of the needle board relative to plane T varies between two extremes $j_e$, where:

$$\phi_e = \arctan[(a_2-b_2)/\sqrt{(a_2 b_2)}]$$

$2a_2$=major axis of the ellipse defined by the outer wound layer;

$2b_2$=minor axis of the ellipse defined by the outer wound layer.

This second implementation can produce constant needling density per unit area by suitably controlling the rate of rotation of the mandrel, the rate of displacement of the mandrel axis in the direction $\Delta$, and the rate at which the needle board orientation is oscillated.

FIGS. 9 and 10 show a third implementation where the elliptical mandrel is still driven in rotation about its axis and, at the same time, the mandrel axis is moved to follow a path Q formed by two half-ellipses (see FIG. 9). As a result of the motion of the mandrel, the outer curved surface of the wound layers remains tangential to the needling plane all along fixed line M. This means that the needle board can strike over a fixed region in the needling plane and it has a fixed orientation relative to this plane. This solution is mechanically more complex to carry out than the two previous solutions (see FIG. 10 which shows the movement of the ellipse defined by the outer wound layer as the mandrel makes a half-turn about its axis). Nevertheless, it is easier to carry out if robotic means are used to control movement of the mandrel.

FIG. 11 shows apparatus for carrying out the first implementation of the winding and needling method described above, in the variation where the axis of the mandrel is not moved but the needle board is moved in order to follow an elliptical path. In this case, contact between the needle board and the outer wound layers takes place in multiple mutually parallel planes and the needle board is tangential to the surface to be needled at the moment of contact.

The apparatus of FIG. 11 comprises a mandrel assembly 100, a needling assembly 500 and a payout assembly 600, all positioned on a machined plate 200 inserted in a floor 300.

The payout assembly 600 comprises a spool 6 of fibrous material strip 1 wound around a central core. A geared motor 7 controls the rotation of the central core of spool 6 to pay out strip 1 and supply it to mandrel assembly 100. As paying out begins, strip 1 is entrained manually around the mandrel until one complete turn has been made and the free end of the strip is trapped under the beginning of the second layer. A selvedge guide cell 8 ensures that the strip is positioned properly relative to the mandrel assembly during subsequent winding. A cell 9 for measuring the diameter of spool 6 is provided beneath the spool in order to measure the change in diameter of the spool 6 during winding. Diameter measuring cell 9 detects the diameter of spool 6 continuously or periodically, for example using optical means. The signal produced by diameter measuring cell 9 can be used to increase the distance between mandrel assembly 100 and needling assembly 500 as the thickness of the layers wound on the mandrel increases.

In mandrel assembly 100, a low eccentricity elliptical mandrel 10 is mounted on a central shaft mounted on a frame 12. Frame 12 is mounted on plate 200 and is guided by a central guide 13 extending under plate 200 so that it can be displaced to move it away from needling assembly 500 as a function of the signal produced by diameter measuring cell 9 in payout assembly 600. A geared motor 14 rotates the central shaft and thus the mandrel 10. In this implementation, geared motor 14 varies the rate of rotation of mandrel 10 so as to keep the relative tangential velocity between the surface to be needled and the needle board constant.

The central shaft is arranged on the frame so that the central shaft, and thus the mandrel, can be moved in the longitudinal direction, i.e. along the axis of mandrel 10, the motion being periodic and used to offset the strike position of the needle board slightly in order to prevent needling from always occurring in the same radial planes. A roller 16 is applied against the outer wound layer on mandrel 10 to hold the wound layers. In FIG. 11, an arrow A indicates the path followed by roller 16 during winding.

Needling assembly 500 comprises a needle board 5 extending across the width of fibrous material strip 1 to be needled and guided at a first end of an extensible arm 20. The other end of the extensible arm is mounted on a housing 22. Arm 20 is forked at its first end and is pressed against the surface of the sleeve during needling by a cylinder 23 bearing on housing 22. The needle board is caused to strike in the transverse direction, i.e. the horizontal direction in FIG. 11. The reciprocating motion of needle board striking is produced by an eccentric drive device 29 lodged in housing 22. In this embodiment, the strike frequency of the needle board 5 is kept constant. Needling assembly 500 also comprises an extractor 24 which can extract fiber particles which may become detached from the fibrous strip during needling.

Housing 22 stands on a slide 25 displaceably mounted and guided on a rod 13 so that it can move away from and towards mandrel assembly 100 under the control of a geared motor 26. A further geared motor 28 controls the vertical displacement of housing 22. Geared motors 26 and 28 are controlled so as to produce a periodic elliptical motion of the needle board in accordance with the variation of the first implementation of the winding and needling method described above. Geared motor 26 is also controlled so as to keep the needling depth constant as the sleeve becomes thicker.

The methods and apparatus described above can be used to produce preforms for annular parts for a variety of uses, in particular brake disks. The preform production methods described above and the choice of constitutive materials for the fibers can be adapted to the nature of the envisaged parts. For brake disk preforms, the choice of fiber orientation relative to the friction faces during winding can be a factor in optimizing the preforms.

As an example, if in the winding and needling methods described above, two-dimensional (0° and 90°) fabric (sheets or woven cloth) are wound so that one direction is parallel to the feed direction of the sheet under the needling head, and rings are cut with a cutting angle of 45°, brake disks can be obtained in which the fibers are inclined relative to the friction faces at an angle of 45°. When brake disks are produced from preforms produced by such methods, shear stresses during service will no longer be in an interstratum direction.

Further, winding multiaxial cloth or sheets of carbon yarns (2 or 3 directions) with two pre-determined yarn directions, the angle of attack of the fibers relative to the friction faces of the envisaged brake disk can be selected. The yarns of one of the directions can be constituted by continuous carbon filaments, bonding by needling being ensured by roving yarns such as those in FR-A-2 669 940, positioned in the other direction (the needles are orientated suitably).

We claim:

1. A method of producing preforms for producing annular parts of composite material, comprising providing a mandrel with an elliptical cross section; and winding a strip of fibrous material on the mandrel in superposed layers to produce a preform in the form of an elliptical sleeve;

obtaining annular parts by cutting the sleeve along planes which are not perpendicular to an axis of the sleeve.

2. A method according to claim 1, further comprising needling the superposed layers to connect the superposed layers to each other.

3. A method according to claim 2, further comprising needling each new layer of the fibrous material being wound around the mandrel simultaneously with its winding around the mandrel, using a needle board extending over the width of the strip.

4. A method according to claim 3, wherein during the winding and needling step a needling surface of the needle board is oriented tangentially to a next portion of the fibrous material to be needled at a moment of contact between the mandrel and the needle board.

5. A method according to claim 4, wherein at least a portion of a most outwardly disposed, previously wound layer of the fibrous material is always tangential to a needling plane (T) along the length of a contact line (M) during the winding and needling step.

6. A method according to claim 5, further comprising displacing the needling plane by reciprocating motions of the mandrel and the needle board during the winding and needling step.

7. A method according to claim 5, wherein the position of the contact line in the needling plane remains fixed, and further comprising moving the mandrel such that an axis of the mandrel is periodically moved along a path comprising two half-ellipses during the winding and needling step.

8. A method according to claim 4, further comprising moving the mandrel such that a portion of the most outwardly disposed, previously wound layer is always in a fixed needling position and the needling surface of the needle board moves to remain tangential to the next portion of the fibrous material to be needled, during the winding and needling step.

9. A method according to claim 6 further comprising rotating the mandrel about its axis and, at the same time, displacing the axis of the mandrel with respect to the needling plane, using the reciprocating motion of the mandrel during the winding and needling step.

10. A method according to claim 2, wherein the needle board strikes at a constant frequency during the winding and needling step.

11. A method according to claim 2, further comprising increasing an average distance between the mandrel and the needle board as a thickness of wound layers of the fibrous material increases.

12. A method according to claim 2, wherein the ends of the mandrel are planar faces which are mutually parallel and inclined relative to a right cross section of the sleeve, and wherein during the winding and needling step there is a relative displacement between the sleeve and the strip of the fibrous material being wound, said relative displacement provided by a reciprocating motion of the mandrel in a longitudinal direction of the mandrel.

13. A method according to claim 1, further comprising cutting the sleeve along a cutting angle, wherein the cutting angle is selected so that each of the rings resulting from the cutting have a circular cross section at an inner periphery or at an outer periphery, or at a predetermined position between the inner periphery and the outer periphery.

14. A method according to claim 13, wherein the cutting angle is selected so that rings resulting from the cutting are circular at their half-width.

15. A method according to claim 1, wherein the cutting step is performed after at least one sleeve densification step.

16. A method according to claim 15, wherein during the at least one sleeve densification step the sleeve is densified by temperature gradient chemical vapor infiltration.

17. A method according to claim 1, further comprising machining a periphery of the annular part to produce a brake disk.

18. A method according to claim 17, wherein the strip of fibrous material is aligned with a feed direction of the mandrel.

19. A method according to claim 8, further comprising:
rotating, during the winding and needling step, the mandrel about its axis and, at the same time, displacing an axis of the mandrel with a reciprocating motion to approach and move away from the plane or needling position;

striking, during the winding and needling step, the needle board against the strip of fibrous material at a constant frequency; and increasing, during the winding and needling step, the average distance between the mandrel and the needle board as the thickness of the assembly of wound layers increases.

20. A method according to claim 19, wherein
the ends of the mandrel are planar faces which are mutually parallel and inclined relative to a right cross section of the sleeve, and further comprising, during the winding and needling step, providing a relative displacement between the sleeve and the strip of fibrous material, said relative displacement provided by a reciprocating motion of the mandrel in the longitudinal direction of the mandrel.

21. A method according to claim 19, further comprising:
selecting a cutting angle of the sleeve such that the cut rings resulting from the cutting have a circular cross section at their inner periphery or at their outer periphery, or at a predetermined position between the inner and outer peripheries, or at their half-width; and
providing, prior to cutting the sleeve, at least one sleeve densification step, wherein the sleeve is densified by temperature gradient chemical vapor infiltration during the at least one sleeve densification step.

22. A method according to claim 20, further comprising:
selecting a cutting angle for cutting the sleeve such that the rings resulting from the cutting have a circular cross section at their inner periphery or at their outer periphery, or at a predetermined position between the inner and outer peripheries, or at their half-width; and
providing, prior to cutting the sleeve, at least one sleeve densification step, wherein
the sleeve is densified by temperature gradient chemical vapor infiltration during the at least one sleeve densification step.

23. A method according to claim 21, further comprising: machining an inner and/or an outer periphery of the annular part; and
wherein the strip of fibrous material is aligned with a feed direction of the mandrel during the winding step.

24. A method according to claim 22, further comprising:
machining an inner and/or an outer periphery of the annular part; and
aligning, during the winding step, the strip of fibrous material with the feed direction of the mandrel.

25. Apparatus for producing preforms for producing annular parts of composite material, comprising:
a mandrel having an elliptical cross section; and
means for winding a fibrous material strip on the mandrel in superposed layers to produce a preform in the form of an elliptical sleeve.

26. Apparatus according to claim 25, further comprising a needle board for striking layers of the fibrous material strip while they are simultaneously being wound onto the elliptical mandrel, thereby connecting the layers together by needling.

27. Apparatus according to claim 26, further comprising means for moving the needle board and/or the mandrel such that a needling surface of the needle board is in a plane tangential to a next portion of the fibrous material strip to be wound and a most outwardly disposed, previously wound layer of the fibrous material strip, at the moment of mutual contact between the next portion of the fibrous material strip to be wound and the most outwardly disposed, previously wound layer of the fibrous material strip.

28. Apparatus according to claim 27, characterized in that the means for moving the needle board and/or mandrel maintain a portion of the most outwardly disposed, previously wound layer of the fibrous material strip in a tangential orientation to a needling plane along the length of a contact line.

29. Apparatus according to claim 28, wherein the means for moving the needle board and/or the mandrel further comprises means for moving the needle board and/or the mandrel such that the contact line in the needling plane is displaced along the needling plane with reciprocating motion of the needle board.

30. Apparatus according to claim 28, wherein the means for moving the needle board and/or the mandrel moves the needle board and/or the mandrel such that an axis of the mandrel is periodically moved along a path comprising two half-ellipses so that the position of a contact line in the needling plane remains fixed.

31. Apparatus according to claim 27, wherein the means for moving the needle board and/or the mandrel moves the mandrel such that a portion of the most outwardly disposed, previously wound layer of the fibrous material strip is maintained in a fixed needling position and the needling surface of the needle board is maintained tangential to the next portion of the fibrous material strip to be wound and the most outwardly disposed, previously wound layer of the fibrous material strip.

32. Apparatus according to claim 28, wherein the means for moving the needle board and/or the mandrel include means for moving an axis of the mandrel with reciprocating motion to approach and move away from needling plane or position.

33. Apparatus according to claim 25, further comprising means for striking the fibrous material strip with the needle board at a constant frequency.

34. Apparatus according to claim 25, further comprising means for increasing an average distance between the mandrel and the needle board as a thickness of wound layers of the fibrous material strip increases.

35. Apparatus according to claim 25, wherein the ends of the mandrel are planar faces which are parallel to each other and not perpendicular to an axis of the sleeve, and further comprising means for controlling a relative displacement between the mandrel and the strip of fibrous material during winding, the relative displacement provided by a reciprocating motion in a longitudinal direction of the mandrel.

36. Apparatus according to claim 32, further comprising:
   means for striking the needle board against the strip of fibrous material at a constant frequency;
   means for increasing an average distance between the mandrel and the needle board as a thickness of wound layers of the strip of fibrous material increases;
   wherein the ends of the mandrel are planar faces which are parallel to each other and not perpendicular to an axis of the sleeve; and
   means for controlling a relative displacement between the mandrel and the strip of fibrous material during winding, the relative displacement provided by a reciprocating motion of the mandrel along a longitudinal direction of the mandrel.

* * * * *

UNITED STATES PATENT AND TRADEMARK OFFICE
CERTIFICATE OF CORRECTION

PATENT NO.    : 5,991,987
DATED         : November 30, 1999
INVENTOR(S)   : Pierre Olry et al.

It is certified that error appears in the above-identified patent and that said Letters Patent is hereby corrected as shown below:

Title page,
Item [22], "Jun. 6, 1996" should read -- Jun. 18, 1996 --;
ABSTRACT, line 10, "delanination" should read -- delamination --;

Column 1,
Line 6, "INVENTIONS" should read -- INVENTION --;

Column 2,
Lines 56, 58 and 61, "yams" should read -- yarns --;

Column 6,
Line 29, "yams" should read -- yarn --;
Line 63, "thenmome-" should read -- thermome- --;

Column 7,
Line 11, "ES" should read -- E5 --;
Line 39, "a" should read -- α --;

Column 12,
Line 40, "yam" should read -- yarn --; and
Lines 43 and 45, "yams" should read -- yarns --.

Signed and Sealed this

Ninth Day of April, 2002

*Attest:*

*Attesting Officer*

JAMES E. ROGAN
*Director of the United States Patent and Trademark Office*